United States Patent
Lauer

(10) Patent No.: US 12,539,940 B2
(45) Date of Patent: Feb. 3, 2026

(54) CHAIN GUIDE WITH PRELOADED GUIDE ELEMENTS

(71) Applicant: Sport Import GmbH, Edewecht (DE)

(72) Inventor: Swen Lauer, Garmisch-Partenkirchen (DE)

(73) Assignee: SPORT IMPORT GMBH, Edewecht (DE)

( * ) Notice: Subject to any disclaimer, the term of this patent is extended or adjusted under 35 U.S.C. 154(b) by 20 days.

(21) Appl. No.: 18/904,273

(22) Filed: Oct. 2, 2024

(65) Prior Publication Data

US 2025/0019034 A1 Jan. 16, 2025

Related U.S. Application Data

(63) Continuation of application No. PCT/EP2023/053982, filed on Feb. 16, 2023.

(30) Foreign Application Priority Data

Apr. 6, 2022 (DE) .......................... 102022203451.1

(51) Int. Cl.
*B62M 9/16* (2006.01)
*B62M 9/00* (2006.01)
*F16H 7/18* (2006.01)

(52) U.S. Cl.
CPC ................ *B62M 9/16* (2013.01); *F16H 7/18* (2013.01); *B62M 2009/007* (2013.01); *F16H 2007/185* (2013.01)

(58) Field of Classification Search
CPC ..... B62M 9/16; B62M 2009/007; F16H 7/18; F16H 2007/185
See application file for complete search history.

(56) References Cited

U.S. PATENT DOCUMENTS 5,460,576 A * 10/1995 Barnett .................. B62M 9/136
474/140
6,354,973 B1 * 3/2002 Barnett .................... B62J 13/00
474/140

(Continued)

FOREIGN PATENT DOCUMENTS

EP 1 367 227 A2 12/2003
EP 2 140 170 A1 1/2010

(Continued)

OTHER PUBLICATIONS

International Search Report and Written Opinion issued in application No. PCT/EP2023/053982.

*Primary Examiner* — Henry Y Liu

(74) *Attorney, Agent, or Firm* — McClure, Qualey & Rodack, LLP

(57) ABSTRACT

The present invention relates to a chain guide for a drive chain of a vehicle, the chain guide comprising a mounting part by means of which the chain guide is mounted on the vehicle, and a slider mounted on the mounting part for guiding the drive chain. The slider comprises a first guide element and a second guide element rotatable relative thereto, wherein the drive chain to be guided passes between these two guide elements when the chain guide is mounted on the vehicle. The two guide elements are preloaded against each other by means of a preloading device, transversely to the running direction of the chain.

13 Claims, 3 Drawing Sheets

(56) References Cited

U.S. PATENT DOCUMENTS

| | | | | |
|---|---|---|---|---|
| 6,533,690 B2* | 3/2003 | Barnett | ................ | B62M 9/138 |
| | | | | 474/140 |
| 6,955,622 B2* | 10/2005 | Bachmair | ................ | F01L 1/46 |
| | | | | 474/140 |
| 7,677,998 B2* | 3/2010 | Tetsuka | ................ | B62M 9/136 |
| | | | | 474/82 |
| 8,235,849 B2* | 8/2012 | Cranston | ................ | B62J 13/00 |
| | | | | 280/727 |
| 8,491,429 B2* | 7/2013 | Cranston | ................ | B62J 13/00 |
| | | | | 474/144 |
| 8,961,342 B2* | 2/2015 | Emura | ................ | B62M 9/136 |
| | | | | 474/140 |
| 8,968,129 B2* | 3/2015 | Emura | ................ | B62M 9/16 |
| | | | | 474/140 |
| 9,249,867 B2* | 2/2016 | Graziosi | ................ | F16H 7/18 |
| 10,053,188 B2* | 8/2018 | Staples | ................ | B62M 9/121 |
| 10,464,635 B2* | 11/2019 | Pfeiffer | ................ | B62J 13/00 |
| 10,787,227 B2* | 9/2020 | Staples | ................ | B62M 9/105 |
| 11,524,746 B2* | 12/2022 | Barefoot | ................ | B62M 9/00 |
| 11,613,326 B2* | 3/2023 | Barefoot | ................ | B62M 9/00 |
| | | | | 474/140 |
| 11,827,311 B2* | 11/2023 | Barefoot | ................ | B62M 9/00 |
| 11,919,592 B2* | 3/2024 | Davis | ................ | B62M 9/00 |
| 12,054,223 B2* | 8/2024 | Mailen | ................ | B62M 9/02 |
| 12,208,860 B2* | 1/2025 | Winans | ................ | B62M 9/131 |
| 12,286,183 B2* | 4/2025 | Davis | ................ | B62J 13/00 |
| 2007/0178998 A1* | 8/2007 | Tetsuka | ................ | B62M 9/136 |
| | | | | 474/82 |
| 2009/0220319 A1* | 9/2009 | Weagle | ................ | B62M 9/126 |
| | | | | 411/103 |
| 2013/0053196 A1* | 2/2013 | Emura | ................ | B62M 9/136 |
| | | | | 474/140 |
| 2013/0217527 A1* | 8/2013 | Graziosi | ................ | B62M 9/16 |
| | | | | 474/140 |
| 2016/0146314 A1* | 5/2016 | Graziosi | ................ | B62M 9/16 |
| | | | | 474/111 |
| 2017/0045121 A1* | 2/2017 | Staples | ................ | B62M 9/105 |
| 2018/0319459 A1* | 11/2018 | Staples | ................ | B62M 9/105 |
| 2022/0106015 A1* | 4/2022 | Winans | ................ | B62M 9/00 |

FOREIGN PATENT DOCUMENTS

| | | |
|---|---|---|
| JP | S61150 884 A | 7/1986 |
| WO | 2008/117319 A1 | 10/2008 |

* cited by examiner

CHAIN GUIDE WITH PRELOADED GUIDE ELEMENTS

CROSS-REFERENCE TO RELATED APPLICATIONS

This application is a continuation of copending International Application No. PCT/EP2023/053982, filed Feb. 16, 2023, which is incorporated herein by reference in its entirety, and additionally claims priority from German Application No. 102022203451.1, filed Apr. 6, 2022, which is also incorporated herein by reference in its entirety.

The innovative concept described herein relates to a chain guide for guiding a chain of a chain drive in vehicles, in particular in two-wheeled vehicles. The chain guide can prevent the chain from unintentionally falling off a pinion and the like.

BACKGROUND OF THE INVENTION

Chain drives are a proven means of transmitting the driving force to the driven wheel or wheels in vehicles. Drive chains are frequently used in particular in bicycles and motorcycles. Thus, for example, in bicycles a drive chain transmits the force from the crank and the driving pinion or chain ring mounted thereto to the rear wheel. In motorcycles, mopeds, etc., but also in E-bikes, pedelecs and the like, the drive chain transmits the driving force of the motor from the driving pinion to the rear wheel.

Bicycles with gear shift generally have a rear derailleur. This rear derailleur is mounted on the rear frame triangle in the region of the rear wheel axle by means of a derailleur hanger, also known as a dropout. With the aid of the rear derailleur, the chain can be moved onto the different pinions of the sprocket in order to shift the individual gears. Such a rear derailleur has a spring-actuated cantilever in order to compensate for the different chain lengths on pinions of different sizes and thereby keep the chain under tension.

As a result of impacts on the rear wheel, for example when driving down a curb or when driving downhill with a mountain bike, the spring-actuated cantilever of the rear derailleur can spring forward unintentionally. As a result, the tension of the chain decreases briefly and the chain sags. Due to the lack of chain tension, it can happen that the slack chain detaches itself from the drive-side chain ring. Then, the chain falls off the chain ring.

However, this problem can also occur in two-wheeled vehicles without rear derailleur. For example, when the chain generally has too little tension. Here, too, there is the risk that the chain detaches itself from the drive-side pinion or chain ring in the event of impacts on the rear wheel.

In order to counter this problem, so-called chain guides are available. The same are offered in particular for downhill-oriented mountain bikes, since the impacts on the rear wheel described above occur increasingly. There are different configurations and placement possibilities for the chain guides. However, all chain guides have a slider in common, through which the chain passes. This slider holds the chain in place to the greatest possible extent, so that the risk of the chain falling off can be significantly minimized as a result.

Such sliders are usually configured in two parts. In order to insert the chain, the block is opened by moving the two block parts against each other. After the chain has been inserted, the two block parts are then screwed together, so that the chain can pass between the two fixed block parts. The screw connection offers a secure and solid type of fastening of the two block parts. However, it has been shown in practice that the screw connection is impractical in that the chain guide cannot be opened again without tools, in order, for example, to repair the chain on the way or to detach the chain again in the case of a so-called chain suck.

In another variant, the two block parts are held together with a snap-fit. This allows the block to be opened and closed without tools. However, it has been shown that this type of mounting is only suitable to a limited extent, since the snap-fit can open during travel, so that the block opens and the chain is no longer guided. This can be observed in particular in the case of downhill bikes or in the case of rough downhill drives. In addition, the snap-fit tends to become loose.

SUMMARY

According to an embodiment, a chain guide for guiding a drive chain of a vehicle may have: a mounting part by means of which the chain guide is mounted on the vehicle, and a slider mounted on the mounting part for guiding the drive chain, wherein the slider includes a first guide element and a second guide element rotatable relative thereto, wherein the drive chain to be guided passes between these two guide elements when the chain guide is mounted on the vehicle, characterized in that the two guide elements are preloaded against each other by means of a preloading device, transversely to the running direction of the chain.

The inventive chain guide serves for guiding a drive chain of a vehicle with a chain drive. The chain guide comprises a mounting part by means of which the chain guide is mounted on the respective vehicle. Additionally, the chain guide comprises a slider mounted on the mounting part, which slider guides the drive chain when the chain guide is mounted on the vehicle. The slider comprises a first guide element and a second guide element rotatable relative thereto, wherein the drive chain to be guided passes between these two guide elements when the chain guide is mounted on the vehicle. According to the invention, the two guide elements are preloaded against each other by means of a preloading device, namely transversely to the running direction of the chain. Due to the preload, the two guide elements hold each other together in the manner of a preloaded clamp. When this preload is applied, a high force is needed in order to rotate the two guide elements against each other. In some cases, a mechanical safety device is provided which prevents a rotation of the two guide elements in the preloaded state. Only when the two guide elements are moved away from each other translationally, against the loading force, can the two guide elements subsequently be rotated against each other. This makes it possible for the two guide elements to be fixedly connected to each other in the preloaded state, so that the same cannot open unintentionally during travel. On the other hand, the slider can be simply opened, for example for maintenance purposes, by first releasing the two guide elements from each other against the preload force and subsequently rotating them against each other.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments are described in more detail with reference to the figures, wherein elements with the same or similar function are provided with the same reference numbers.

The chain guide described herein is suitable for a vehicle which is driven by means of a chain drive. This means that the chain of the chain drive to be guided connects the drive of the vehicle (e.g. crank, motor, etc.) to the output of the vehicle (transmission, sprocket cluster, cassette, rear wheel, etc.). The vehicle can be, for example, single-track vehicles, in particular two-wheeled vehicles. This includes, for example, non-motorized bicycles which are driven by means of a crank, and motorized bicycles, such as, e.g., E-bikes and pedelecs, which have an additional motor, in particular in the form of an electric motor. However, the chain guide described herein is also suitable for motorized two-wheeled vehicles, such as, e.g., mopeds, motorcycles and the like, if the same have a chain drive. Further, multi-track vehicles with a chain drive, such as, e.g., quads and the like, are included in the term vehicle used herein. For the following description of the inventive chain guide, reference is made purely by way of example to a bicycle. However, all statements or explanations made herein generally apply to all vehicles with a chain drive, in particular to the categories of vehicles mentioned at the beginning of this paragraph.

Figure 1:
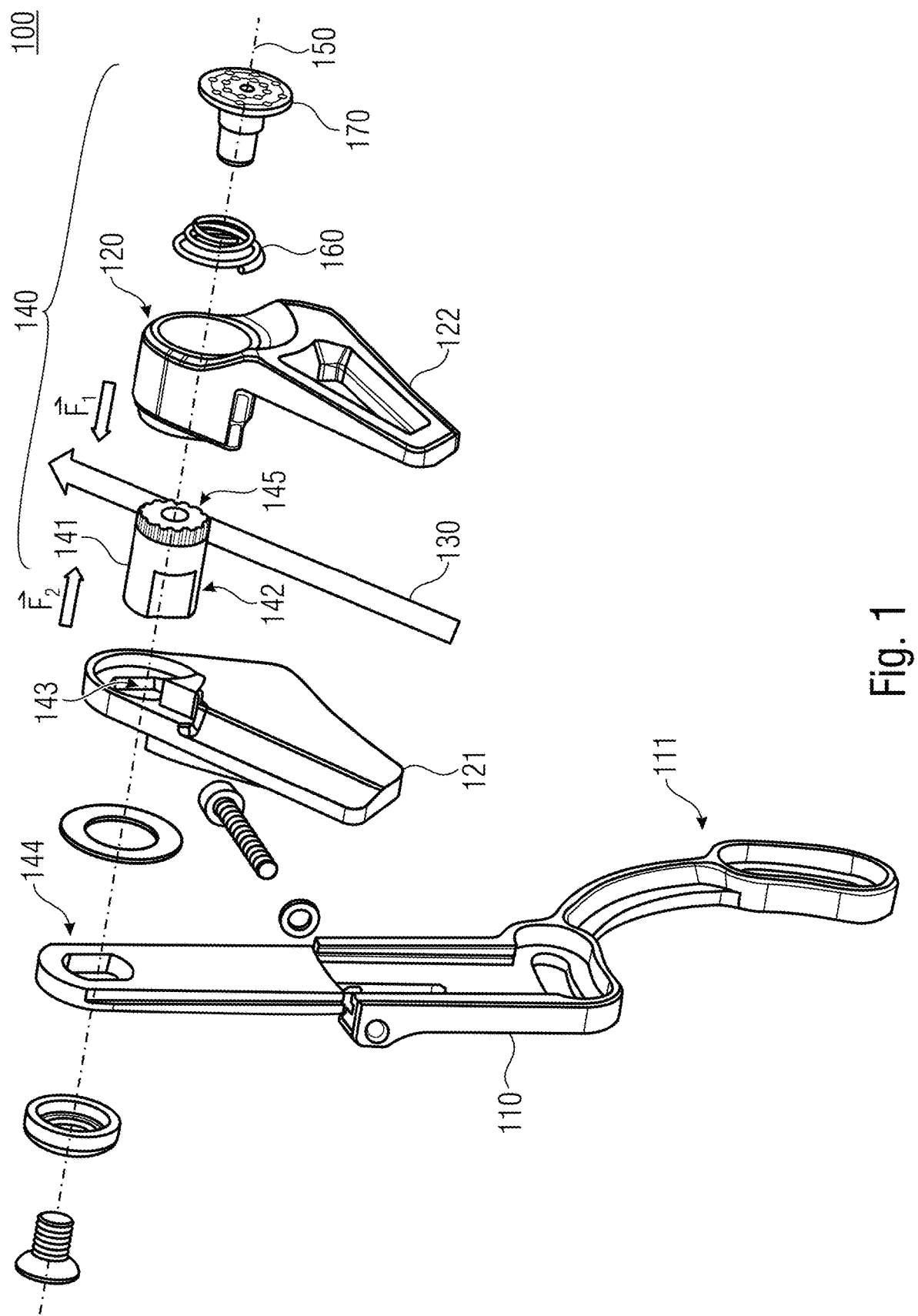
FIG. 1 is an exploded view of an inventive chain guide according to an embodiment.

First, FIG. 1 shows an exploded view of an inventive chain guide 100. The chain guide comprises a mounting part 110 by means of which the chain guide 100 is mounted on the vehicle. For example, the mounting part 110 can comprise an attachment portion 111 that is attached to the frame of a bicycle in a region around the bottom bracket. As shown here by way of example, the attachment portion 111 can comprise elongated holes for screws. The screws are guided through the elongated holes and engage with corresponding threaded holes in the bicycle frame located behind the same. Thus, the entire mounting part 110 can be mounted on the vehicle or on the bicycle.

Additionally, the chain guide 100 comprises a slider 120 mounted on the mounting part 110. According to the invention, the slider 120 is configured in several parts (e.g., at least in two parts). The slider 120 comprises at least one first guide element 121 and a second guide element 122 rotatable relative thereto. The slider 120 serves for guiding the drive chain, wherein the drive chain to be guided passes between the two guide elements 121, 122 when the chain guide 100 is mounted on the vehicle.

For the sake of clarity, the chain to be guided is not shown here. However, in the assembled state of the chain guide 100 mounted on the vehicle, the same passes between the two guide elements 121, 122, which is shown in the form of the arrow 130. This arrow 130 additionally symbolizes the running direction of the chain.

According to the invention, the two guide elements 121, 122 are preloaded against each other by means of a preloading device 140, namely transversely to the running direction 130 of the chain. This means that the first guide element 121 is pressed by means of the preloading device 140 in the direction of the second guide element 122, which is shown by the force vector $\vec{F}_1$. The second guide element 122 is pressed by means of the preloading device 140 in the direction of the first guide element 121, which is shown by the force vector $\vec{F}_2$.

As mentioned above, the two guide elements 121, 122 are preloaded against each other transversely to the running direction 130 of the chain. This means that the force vectors $\vec{F}_1$ and $\vec{F}_2$ run transversely to the chain running direction 130. This can be understood in particular to mean that the force vectors $\vec{F}_1$ and $\vec{F}_2$ are directed essentially orthogonally to the chain running direction 130. Thus, the two guide elements 121, 122 would also be preloaded against each other essentially orthogonally to the running direction 130 of the chain.

The first guide element 121 is non-rotatably mounted on the mounting part 110. The second guide element 122 is rotatable relative to the first guide element 121. As mentioned above, the second guide element 122 is preloaded towards the first guide element 121. The two guide elements 121, 122 thus have a type of preloaded clamping connection, wherein the same are pulled towards each other due to the preload. The mutual attraction forces, i.e. the force vectors $\vec{F}_1$ and $\vec{F}_2$, can be so strong that a rotation of the second guide element 122 is not possible.

In order to be able to rotate the second guide element 122 relative to the first guide element 121, the preload first has to be released. According to the invention, for this purpose, the slider 120 is configured such that the second guide element 122 has to be first be moved away from the first guide element 121 in order to release the same from the first guide element 121 against the preload before the same can subsequently be rotated relative to the first guide element 121.

Figure 2A:
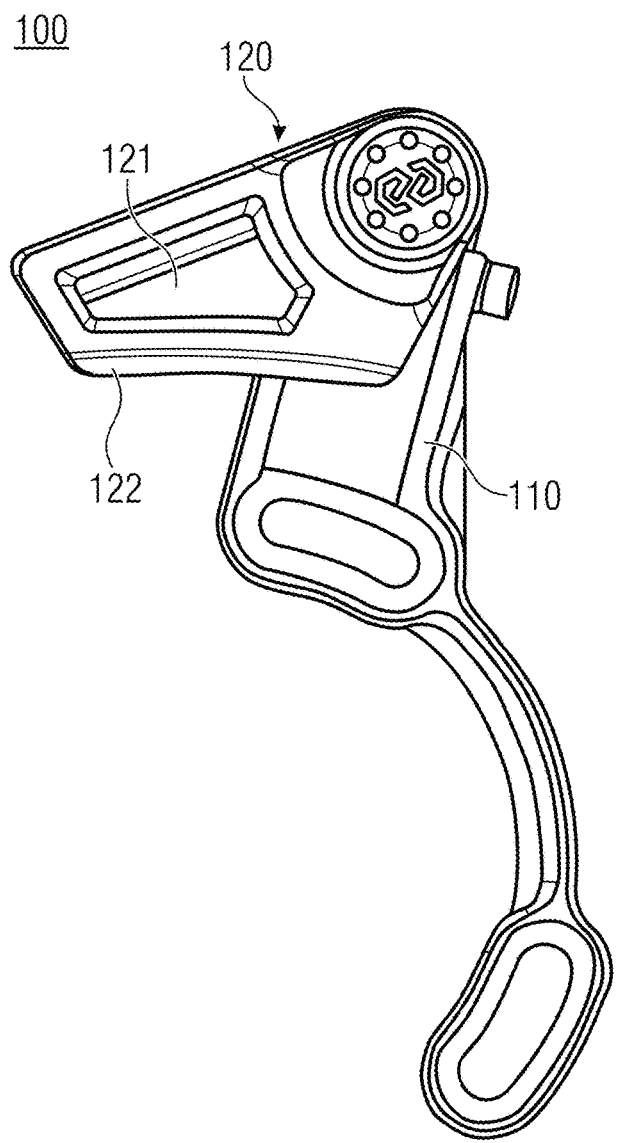
FIG. 2A is a schematic top view of a chain guide in the closed state according to an embodiment.

FIG. 2A shows a front view of the inventive chain guide 100 in an assembled state, wherein here the slider 120 is closed. This means that the first guide element 121 and the second guide element 122 lie congruently opposite each other, so that the chain can pass between the two guide elements 121, 122. This corresponds to the state of the chain guide 100 in operation.

In this closed state, the preload device 140 can have a lower latching position. This means that the second guide element 122 can latch in a fixed manner in this position, so that the same can no longer be rotated relative to the first guide element 121 when the preload forces $\vec{F}_1$ and $\vec{F}_2$ act. Here, too, applies again: the second guide element 122 has to be first moved away from the first guide element 121 in order to release the preload. Only then does the second guide element 122 detach itself from its lower latching position and can be rotated relative to the first guide element 121. In this case, the same could be folded upward, for example, in order to open the slider 120 (see FIG. 2B).

Figure 2B:
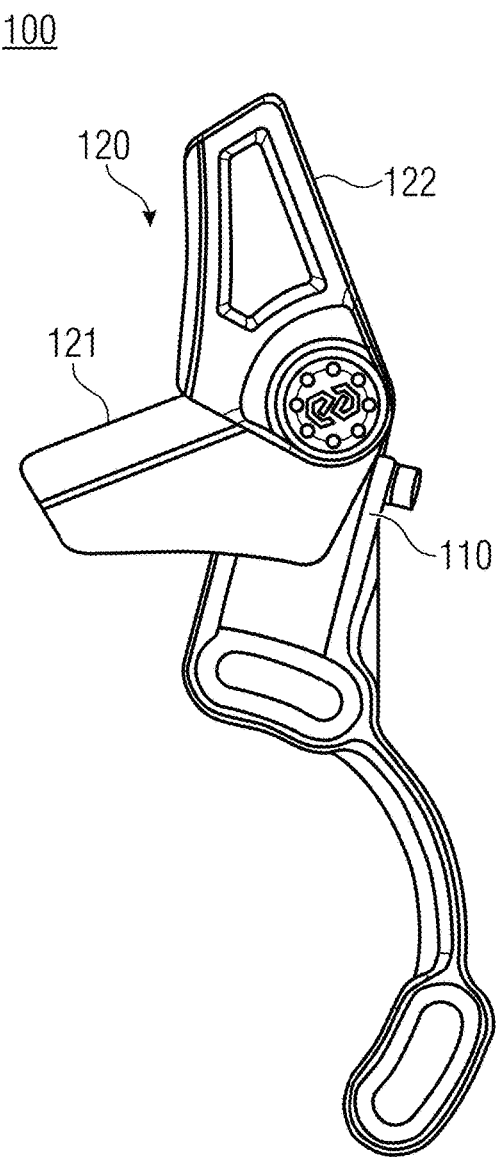
FIG. 2B is a schematic top view of a chain guide in the open state according to an embodiment.

FIG. 2B shows a front view of the inventive chain guide 100 in an assembled state, wherein here the slider 120 is open. This means that the second guide element 122 is rotated relative to the first guide element 121 and folded upward. In this open state, the chain can be removed from the chain guide 100.

Here, the preload device 140 can have an upper latching position. This means that the second guide element 122 can latch in a fixed manner in this folded-up position, so that the same can no longer be rotated relative to the first guide element 121 when the preload forces $\vec{F}_1$ and $\vec{F}_2$ act. Here, too, applies again: the second guide element 122 has to be first moved away from the first guide element 121 in order to release the preload. Only then does the second guide element 122 detach itself from its upper latching position and can be rotated relative to the first guide element 121. In this case, the same could be folded down again in order to close the slider 120 again (see FIG. 2A).

The latching positions described can be made possible, for example, by means of suitable tooth contours, as will be explained in more detail later with reference to FIGS. 1 and 3.

First, reference is again made to FIG. 1. Here, it can be seen that the two guide elements 121, 122 are rotatable relative to each other along a common rotation axis 150, and that the preload device 140 is also arranged along this rotation axis 150.

In this exemplary configuration, the preload device 140 comprises an adapter piece 141. This adapter piece 141, viewed along the rotation axis 150, is arranged between the first guide element 121 and the second guide element 122. The adapter piece 141 is configured to fix the first guide element 121 to the mounting part 110 non-rotatably relative to the same.

For this purpose, the adapter piece 141 can comprise, on a side facing the first guide element 121, a contour 142 that is configured to engage in a complementary contour 143 formed in the first guide element 121 in order to establish a form-fit and non-rotatable connection with the first guide element 121. These contours 142, 143 can be specific shapes that are complementary to each other, which can be configured both in the adapter piece 141 and in the first guide element 121. These complementary contours 142, 143 fit together according to the key-lock principle and form a form-fit and non-rotatable connection. In FIG. 1, a round adapter piece 141 with two flattened edges is shown purely by way of example. This shape (round with flattened edges) can also be found accordingly in the first guide element 121 (see reference number 143).

The mounting part 110 can also comprise a corresponding contour 144 that is complementary to the contour 142 of the adapter piece 140. The adapter piece 141 can extend through the complementary contour 143 in the first guide element 121 and extend up to the complementary contour 144 of the mounting part 110. On the rear side, i.e. from a side of the mounting part 110 facing away from the first guide element 121, the adapter piece 141 can be fixed by means of a screw. As a result, the adapter piece 141 is fixed to the mounting part 110, wherein the adapter piece 141 simultaneously also non-rotatably fixes the first guide element 121 to the mounting part 110 by means of the complementary contours 142, 143.

Additionally, the adapter piece 141 is configured to fix the second guide element 122 to the mounting part 110 rotatably relative to the first guide element 121. For this purpose, the adapter piece 141 can comprise, on a side facing the second guide element 122, a toothing 145 that is configured to engage in a complementary toothing 146 (see FIG. 3) formed in the second guide element 122 in order to allow a stepwise rotation of the second guide element 122 relative to the first guide element 121.

Figure 3:
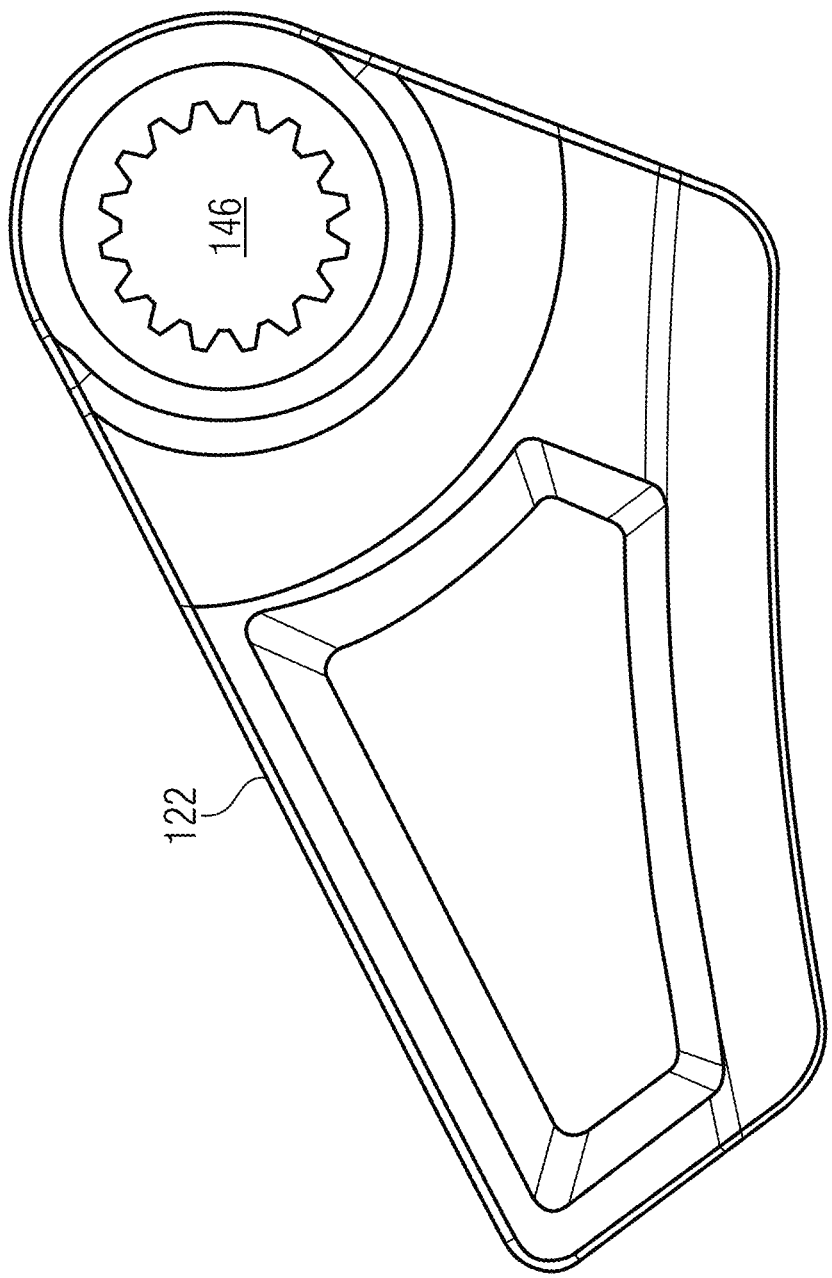
FIG. 3 is a schematic top view of a second guide element with teeth according to an embodiment.

FIG. 3 shows a top view of the second guide element 122 with a corresponding toothing 146. This toothing 146 engages in the complementary toothing 145 in the adapter piece 141 (see FIG. 1). Thus, the second guide element 122 can be rotated stepwise, i.e. tooth by tooth. In this way, for example, the latching positions described above with reference to FIGS. 2A and 2B can be realized. For example, a first pair of toothings could allow a non-rotatable connection in the lower latching position, and a second pair of toothings could allow a non-rotatable connection in the upper latching position. Additional pairs of toothings between the first and second pairs of toothings can accordingly be optional.

Here, the second guide element 122 is mounted on the adapter piece 141 such that a release of the toothing 145, 146 is possible by means of a movement against the preload. This means that in order to rotate the second guide element 122, the second guide element 122 has to be first be pulled out against the preload $\vec{F}_1$ and $\vec{F}_2$. As a result, the toothing 145, 146 between the second guide element 122 and the adapter piece 141 detaches itself, and the second guide element 122 can be rotated.

FIG. 1 shows a possible configuration for realizing this toothing 145, 146 which can be released against the preload. For this purpose, a preload element 160 and a fixing element 170 are provided on a side of the second guide element 122 opposite the adapter piece 141. These components are part of the preload device 140 described above, i.e. the preload device 140 in this example comprises the adapter piece 141, the preload element 160 and the fixing element 170.

The preload element 160 generates the preload forces $\vec{F}_1$ and $\vec{F}_2$ needed for the mutual preload of the two guide elements 121, 122. The preload element 160 can be, for example, a spring. The fixing element 170 can comprise, for example, a screw. The screw head can be configured such that the preload element 160 is supported thereon.

The second guide element 122 can now be mounted on the adapter piece 141 by means of the fixing element 170 in the sense of an axial clearance fit, namely such that the second guide element 122 is axially displaceable along the rotation axis 150. This means that without the preload element 160, the second guide element 122 would be freely movable on the fixing element 170 due to the clearance fit. However, since the preload element 160 is arranged between the second guide element 122 and the fixing element 170 (in order to generate the preload), the second guide element 122 is pressed by means of the preload element 160 in the direction of the first guide element 121, and the axial clearance fit is compensated by the preload force.

In FIG. 3, a toothing 146 was shown as an example of a contour that allows a stepwise (tooth by tooth) rotation of the second guide element 122 relative to the first guide element 121. However, it would also be possible that, instead of the toothing, a toothless friction surface is present both on the adapter piece 141 and on the second guide element 122. This toothless friction surface could be realized, for example, in the form of a cone. In this case, the friction force on the cone with applied preload force $\vec{F}_1$ and $\vec{F}_2$ could be so high that a rotation of the second guide element 122 relative to the first guide element 121 is not possible. Here, too, the rotation would be possible only after the second guide element 122 is moved away from the first guide element 121 against the preload. Due to the lack of toothing, i.e. due to the toothless contour, continuous rotation of the second guide element 122 relative to the first guide element 121 would be made possible.

Due to the inventive preload of the two guide elements 121, 122 described herein, the slider 120 can be opened and closed without tools. In addition, the preload forces $\vec{F}_1$ and $\vec{F}_2$ are sufficiently large to avoid unintentional opening of the slider 120 during travel.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A chain guide for guiding a drive chain of a vehicle, the chain guide comprising:
  a mounting part by means of which the chain guide is mounted on the vehicle, and
  a slider mounted on the mounting part for guiding the drive chain,
    wherein the slider comprises a first guide element and a second guide element rotatable relative thereto, wherein the drive chain to be guided passes between these two guide elements when the chain guide is mounted on the vehicle,
    wherein
      the two guide elements are preloaded against each other by means of a preloading device, transversely to the running direction of the chain.

2. The chain guide according to claim 1,
wherein the first guide element is non-rotatably mounted on the mounting part, and
wherein the second guide element is rotatable with respect to the first guide element and is preloaded towards the first guide element.

3. The chain guide according to claim 1,
wherein the slider is configured such that the second guide element has to be first moved away from the first guide element in order to release the same from the first guide element against the preload before the same can subsequently be rotated relative to the first guide element.

4. The chain guide according to claim 1,
wherein the preload device comprises a lower latching position in which the slider is closed, and in which the second guide element is fixed non-rotatably relative to the first guide element.

5. The chain guide according to claim 1,
wherein the preload device comprises an upper latching position in which the slider is open, and in which the second guide element is fixed non-rotatably relative to the first guide element.

6. The chain guide according to claim 1,
wherein the two guide elements are rotatable relative to each other along a common rotation axis, and
wherein the preload device is arranged along this rotation axis.

7. The chain guide according to claim 6,
wherein the preload device comprises an adapter piece,
  wherein the adapter piece is arranged along the rotation axis between the first guide element and the second guide element, and
  wherein the adapter piece is configured to fix the first guide element to the mounting part non-rotatably relative to the same and to fix the second guide element to the mounting part rotatably relative to the first guide element.

8. The chain guide according to claim 7,
wherein the adapter piece comprises, on a side facing the first guide element, a contour that is configured to engage in a complementary contour formed in the first guide element in order to establish a form-fit and non-rotatable connection with the first guide element.

9. The chain guide according to claim 7,
wherein the adapter piece comprises, on a side facing the first guide element, a contour that is configured to engage in a complementary contour (144) formed in the mounting part in order to establish a form-fit and non-rotatable connection with the mounting part.

10. The chain guide according to claim 7,
wherein the adapter piece comprises, on a side facing the second guide element, a contour that is configured to allow a continuous rotation of the second guide element relative to the first guide element.

11. The chain guide according to claim 7,
wherein the adapter piece comprises, on a side facing the second guide element, a toothing (145) that is configured to engage in a complementary toothing (146) formed in the second guide element in order to allow a stepwise rotation of the second guide element relative to the first guide element.

12. The chain guide according to claim 11,
wherein the second guide element is mounted on the adapter piece such that a release of the toothings is possible by means of a movement against the preload.

13. The chain guide according to claim 7,
wherein a preload element and a fixing element are provided on a side of the second guide element opposite the adapter piece,
wherein the second guide element is mounted on the adapter piece by means of the fixing element in the sense of an axial clearance fit, so that the second guide element is axially displaceable along the rotation axis, and
wherein the preload element is arranged between the second guide element and the fixing element in order to generate the preload and to compensate for the axial clearance fit.

* * * * *